Oct. 25, 1949.    G. B. TEBO    2,485,852
STRAP-ON HEATER

Filed March 9, 1946    2 Sheets-Sheet 1

Inventor
Gordon B. Tebo
By
Gareth E. Maybee
Atty.

Oct. 25, 1949.    G. B. TEBO    2,485,852
STRAP-ON HEATER
Filed March 9, 1946    2 Sheets-Sheet 2
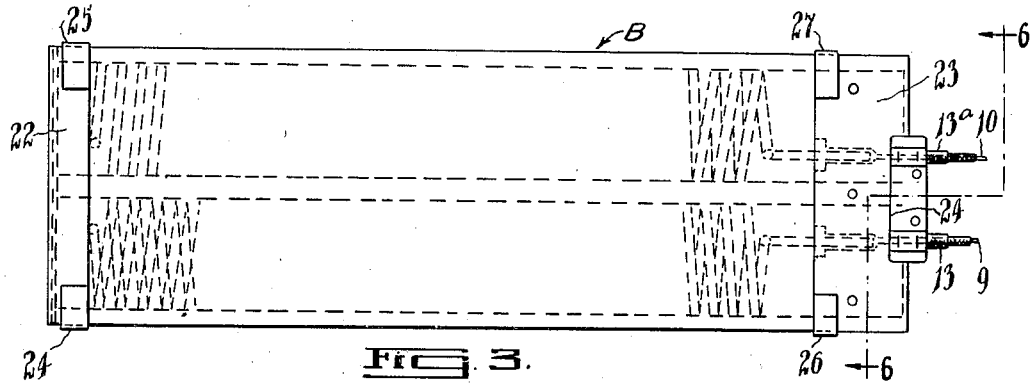
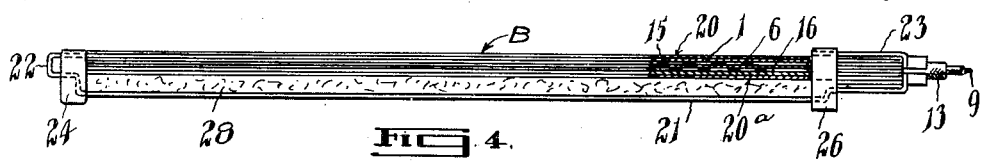
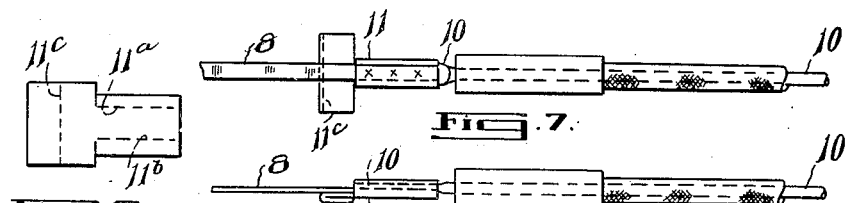
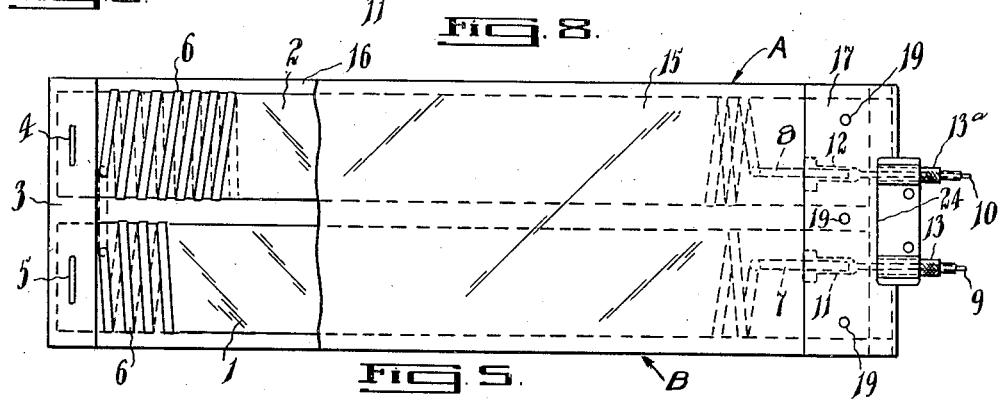
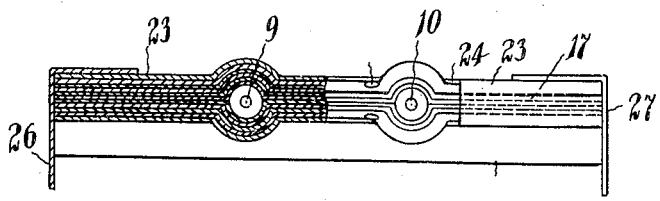
Inventor
Gordon B. Tebo
by Gareth E. Maybee
ATTY.

Patented Oct. 25, 1949

2,485,852

UNITED STATES PATENT OFFICE 2,485,852

STRAP-ON HEATER

Gordon B. Tebo, Toronto, Ontario, Canada

Application March 9, 1946, Serial No. 653,404

12 Claims. (Cl. 219—38)

1

My invention relates to water heaters, and more particularly to electric heaters for domestic hot water tanks.

It is an object of my invention to provide a novel, relatively simple, inexpensive and highly efficient electric heating unit for an ordinary domestic hot water tank.

Another object of my invention is to provide an electric water heater which is so constructed that the heating element assembly may be easily and quickly removed from the heater, and a new one installed, without having to strip down the heat insulating covering of the tank.

Still another object of my invention is to provide an electric heating element for use on a hot water tank that shall be so constructed and clamped thereon as to tightly engage the outer surface of the tank and with a substantially uniform contact pressure over the entire engaging surface.

One of the difficulties inherent to heaters commonly known as strap-on or clamp-on electric water tank heaters, is that after the heater is installed on the tank, the said tank and the heater are covered with a thick insulating material, and if the heater becomes defective and a replacement is required it is necessary to first remove the insulating cover from the tank, which necessitates a considerable amount of work. But according to the present invention, if the heater becomes defective, only the heating element assembly thereof need be replaced, and this may be done simply and easily without removing the insulating cover from the tank.

In the preferred form of my invention I provide a flexible metallic strap having a longitudinal slit throughout a portion of its length, thus forming for a certain length of the strap a wide tongue and a narrow tongue, said wide tongue and narrow tongue being clamped to the other end of the strap, the strap thus embracing the hot water tank. The narrow tongue is permanently clamped to the other end of the strap, whereas the wide tongue is only semi-permanently clamped thereto. A sandwich-type heating element assembly is inserted underneath the wide tongue, and means are provided on the heating element assembly to guide it under the wide band portion and to align these two parts together. If it is desired to remove the heating element assembly, the clamps attaching the wide tongue to the other end of the strap merely have to be loosened, thus releasing the wide tongue, and the heating element is then withdrawn from underneath the said wide

2 tongue. To perform this operation, the insulating cover on the tank does not have to be removed, although of course a small opening must be provided therein to allow access to the clamps to permit withdrawal of the heating element assembly.

Another important feature of this invention is the means whereby I improve the efficiency of heat transmission from the heater to the hot water tank, namely by applying to the outer faces of the mica shields of the heating element assembly, aluminum foil of a thickness of the order of $1/1000$ of an inch to $10/1000$ of an inch; I have found that this aluminum foil causes better distribution of the heat from the resistance wires and thereby considerably improves the efficiency of heat transmission from the heater to the tank.

With the above and other objects in view, the invention consists of the novel features of construction, the combination and arrangement of parts hereinafter more fully set forth, pointed out in the claims and shown in the accompanying drawings wherein:

Figure 3 is a view in front elevation of the heating element assembly.

Figure 4 is an elevation partly broken away of said element assembly.

Figure 5 is a view in front elevation of the resistance wire assembly portion of the heating element assembly.

Figure 6 is a view of the heating element assembly partly in end elevation and partly in cross-section through line 6—6 of Figure 3.

Figure 7 is a plan view of the means whereby the resistance wire is connected to the lead-in wire.

Figure 8 is an elevation view of the means whereby the resistance wire is connected to the lead-in wire.

Figure 9 is a plan view of the clip used at the juncture of the resistance wire with the lead-in wire.

Figure 1:
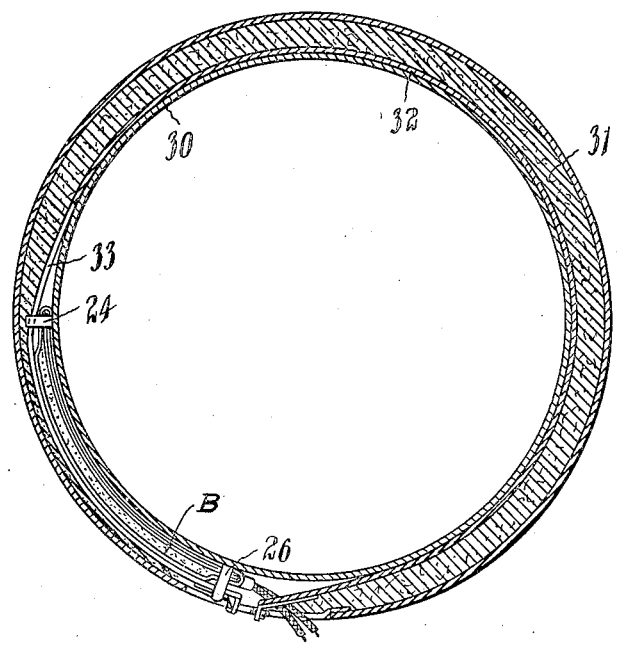
Figure 1 is a horizontal lateral section through a hot water tank provided with an electric water heater embodying my invention and taken through the line 1—1 of Figure 2.
Figure 2:
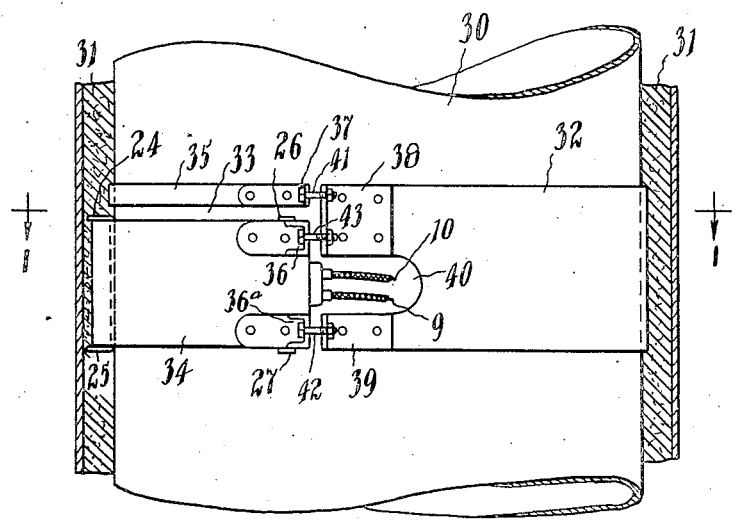
Figure 2 is a view in front elevation of the said water heater, the insulating cover on the tank being shown in cross section.

Referring now particularly to Figure 5, the resistance wire assembly portion of the heating element assembly B will first be described. It comprises two strips of mica 1 and 2 placed side by side and joined at one end by a transverse strip of mica 3 which is stapled to said strips of mica 1 and 2 by means of staples 4 and 5. A continuous length of resistance wire 6, which is preferably flat, is coiled around said strips of mica 1 and 2, and its extremities 7 and 8 are joined to lead-in wires 9 and 10 in a manner better shown in Figures 3 and 5.

The ends 9 and 10 of the lead-in wires are flattened, and on them are placed respectively resistance wires 7 and 8. Clips 11 and 12, which are originally flat stampings as shown in Figure 9, are placed under the lead-in wires at their junction with the resistance wires, and the edge of said clips are upturned along dotted lines 11a and 11b, thus tightly squeezing the joined wires. The large end of each clip is downturned along dotted line 11c. Adjacent each clip and covering a portion of the lead-in wires are glass silicone tubes 13 and 13a. Narrow strips of mica are placed on each side of clips 11 and 12, and extend transversely across the width of the resistance wire assembly.

The resistance wire assembly A is sandwiched between two sheets of mica 15 and 16, and the said resistance wire assembly, mica sheets 15 and 16, and the transversely extending mica strips covering the clips are tightly clamped together by two end cover plates 17 which are riveted by suitable rivets 19.

On the outside faces of sheets of mica 15 and 16 are glued thin sheets of aluminum foil 20 and 20a, said aluminum foil being of a thickness of the order of $1/1000$ to $10/1000$ of an inch. This thin aluminum foil considerably improves the efficiency of heat transmission from the heater to the hot water tank.

Over the resistance wire assembly A encased by the mica sheets 15 and 16 is placed a metallic sheath 21 having upturned ends 22 and 23. A portion of upturned end 23 is cut out at 24 to allow lead-in wires 9 and 10 to pass therethrough. Welded to upturned end 22 are guiding fingers 24 and 25, and similarly welded to upturned 23 are guiding fingers 26 and 27. It will be noted that these guiding fingers are transverse to the sheath 21 and extend over the edges thereof. Inserted between sheath 21 and mica sheet 16 is an asbestos padding 28. Hereinafter the combination of resistance wire assembly A, mica sheets 15 and 16, sheath 21, and other components hereinbefore described will be referred to as the "heating element assembly B." Since the various sheets of mica 1, 2, 15 and 16 are securely attached together at one end only, the heating element assembly is gripped only loosely by the upturned ends 22 and 23 of sheath 21, and it is possible to curve the heating element assembly without causing any distortion or buckling because the various sheets will merely slide on each other, like the leaves of a book.

In Figure 1 is shown a hot water tank 30 around which is wrapped an insulating cover 31. Embracing the hot water tank 30 is a strap 32, at one end of which is a longitudinal slit 33 which divides said strap 32 for a portion of its length into wide tongue 34 and narrow tongue 35. Flange members 36 and 36a are riveted to the end of wide tongue 34, and flange member 37 is rivetted to the end of narrow tongue 35. Similarly, the other end of band 32 is provided with flange members 38 and 39, which are riveted thereto. A suitable bolt 41 joins flange member 37 of narrow tongue 35 to flange member 38 of strap 32, and similarly bolts 43 and 42 join flange members 36 and 36a of wide tongue 34 to flange members 38 and 39 respectively of band 32. Also, a portion of band 32 is cut away at 40 in order to give clearance for the lead-in wires 9 and 10.

When the heater is being installed on a tank, narrow tongue 35 is permanently connected to the other end of strap 32 by means of bolt 41. Then heating element assembly B is inserted under wide tongue 34, the guiding fingers 24, 25, 26 and 27 aligning said heating element assembly with respect to the wide tongue 34. After the heating element assembly has been inserted under wide tongue 34, flange members 36 and 36a are respectively joined to flange members 38 and 39 by means of bolts 43 and 42. Said bolts 42 and 43 are then tightened, thereby pressing the heating element assembly B against the hot water tank.

If the heater becomes defective after a number of years, say due to burning out of the resistance wires, the whole heater need not be replaced; only a new heating element assembly need be provided. In such a case bolts 42 and 43 are loosened and removed, the heating element assembly B is withdrawn from underneath wide tongue 34 and a new heating element assembly is then inserted under said wide tongue in the manner described in the previous paragraph. It should be noted that bolt 41 which joins the narrow tongue 35 to the other end of strap 32 is not loosened when it is necessary to remove a defective heating element assembly from underneath wide tongue 34, and therefore the strap always securely embraces the tank even when bolts 42 and 43 are loosened.

The insulating cover 31 is not stripped down from the tank in order to repair a defective heater, and only a small opening is required in said insulating cover 31 in order to gain access to bolts 42 and 43 and to permit removal or insertion of a new heating element.

It is thought that the construction and use of the invention will be apparent from the above description of the various parts and their purpose. It is to be understood that the form of my invention herewith shown and described, is to be taken as a preferred example of the same, and that various changes in the shape, size and arrangement of parts may be resorted to, without departing from the spirit of my invention, or the scope of the subjoined claims.

Having regard to the foregoing disclosure, the patent of which this specification forms part confers, subject to the conditions prescribed in the Patent act, 1935, the exclusive right, privilege and liberty of making, constructing, using and vending to others to be used, the invention as defined in claims submitted by the patentee as follows.

I claim:

1. In a strap-on heater for tanks and the like, a band, two tongue members disposed side by side, one end of each of the said tongue members secured to one end of the band, the band and one of the tongue members secured thereto providing a strap adapted to extend around the tank, a heating member adapted to be held against the tank by the said strap, and individual means for connecting the free ends of the tongue members to the other end of the band, one of said tongue members being disconnectable to permit insertion or removal of the heating member under said tongue member while the other connecting means still securely connects the other of said tongue members to the band to hold the strap on the tank.

2. In a strap-on heater for tanks and the like, a strap adapted to extend around the tank, disconnectable means for connecting the ends of the strap together, a flexible heating member adapted to be held against the side of the tank by said strap, a supplementary strap attached to the first mentioned strap to retain said first mentioned strap in position on the tank when the ends of said first mentioned strap are disconnected for insertion or removal of the heating member, and means for connecting together the ends of the supplementary strap.

3. In a strap-on heater for tanks and the like, a strap adapted to extend around the tank, said strap being provided with a longitudinal slit through part of its length to form an upper tongue and a lower tongue, individual means for connecting each of said tongues to the opposite end of the strap, and a flexible heating member adapted to be clamped between one of the tongues and the tank, with the inside of the heating member engaging the outer surface of the tank.

4. In a strap-on heater for tanks and the like, a band, two tongue members disposed side by side, one end of each of the said tongue members being secured to one end of the band, the band and one of the tongue members secured thereto providing a strap adapted to extend around the tank, a heating member adapted to be held against the tank by the said strap, individual means for connecting the free ends of the tongue members to the other end of the band, one of said tongue members being disconnectable to permit insertion or removal of the heating member under said tongue members while the other connecting means still securely connects the other of said tongues to the band to hold the strap on the tank, and lugs attached to and extending transversely of the heating member in an outward direction and coacting with the last mentioned tongue member to facilitate alignment of the said heating member with respect to said tongue member.

5. In a strap-on heater for tanks and the like, a strap adapted to extend around the tank, a portion of said strap being longitudinally slit to form a narrow tongue and a wide tongue, transverse flanges at the ends of the tongues and at the other end of the strap, a bolt connecting the flange of the narrow tongue to the flange at the other end of the strap, separate bolting means for connecting the flange of the wide tongue to the aforementioned other end of the strap; and a flexible heating member adapted to be clamped by the wide band against the tank.

6. In a strap-on heater for tanks and the like, a strap adapted to extend around the tank, a portion of said strap being longitudinally slit to form a narow tongue and a wide tongue, transverse flanges at the ends of the tongues and at the other end of the strap, a bolt connecting the flange of the narrow tongue to the flange at the other end of the strap, separate bolting means for connecting the flange of the wide tongue to the aforementioned other end of the strap, a flexible heating member adapted to be clamped by the wide band against the tank, and lugs on the edges of the heating member adapted to guide the heating member and align it under the wide band.

7. In a strap-on heater for tanks and the like, a strap adapted to extend around the tank, a portion of said strap being longitudinally slit to form two tongues, transverse flanges at the ends of the tongues and at the other end of the strap, securing means connecting the flange of one of the tongues to the flange at the other end of the strap, another securing means connecting the flange of the other tongue to the aforementioned other end of the strap, and a flexible heating member adapted to be clamped by one of the tongues against the tank.

8. In a strap-on heater for tanks and the like, a strap adapted to extend around the tank, a portion of said strap being longitudinally slit to form two tongues, transverse flanges at the ends of the tongues and at the other end of the strap, securing means connecting the flange of one of the tongues to the flange at the other end of the strap, another securing means connecting the flange of the other tongue to the aforementioned other end of the strap, a flexible heating member adapted to be clamped by one of the tongues against the tank, and lugs on the edges of the heating member adapted to guide the heating member and align it with respect to the tongue.

9. An electric tank water heater comprising a flexible strap adapted to embrace a tank and having flanged members at the ends thereof, means connected to the flanged members of said strap to tighten said strap about the surface of the tank, an adjustable flexible tongue having one end rigidly connected to said strap, a flat flexible heating element interposed beneath said flexible tongue and means for tightening the other end of said flexible tongue to securely embrace said flexible heating element.

10. An electric tank water heater comprising, a flexible strap adapted to embrace a tank and having flanged members at the ends thereof, means connected to the flanged members of said strap to tighten said strap about the surface of the tank, an adjustable flexible tongue having one end rigidly connected to said strap and having a flanged member at the other end thereof, a flat flexible heating element interposed beneath said flexible tongue, and securing means connecting the flanged member at one end of the flexible tongue to one of the flanged members at the end of the strap for tightening said tongue to securely embrace the flexible heating element.

11. An electric tank water heater comprising, a flexible metal band adapted to embrace a tank and having flanged ends, means adjustably connected to the flanged ends of said band to tighten same about the surface of the tank, an adjustable flexible metal strip having one end rigidly connected to said band, a flat flexible removable electric heater element interposed beneath said flexible strip, and means for tightening the other end of said flexible strip to securely embrace said flexible heater element.

12. An electric tank water heater comprising, a flexible metal band adapted to embrace a tank and having flanged ends, means adjustably connected to the flanged ends of said band to tighten same about the surface of the tank, an adjustable flexible metal strip having one end rigidly connected to said band and having the other end flanged, a flat flexible removable electric heater element interposed beneath said flexible strip, and a bolt extending through one of the flanged ends of said band and through the flanged end of said flexible strip for tightening said strip to securely embrace said flexible heater element.

GORDON B. TEBO.

(References on following page)

REFERENCES CITED

The following references are of record in the file of this patent:

UNITED STATES PATENTS

| Number | Name | Date |
|---|---|---|
| 1,301,995 | Arthur | Apr. 29, 1919 |
| 1,321,462 | Line | Nov. 11, 1919 |
| 1,498,684 | Day | June 24, 1924 |
| 1,632,651 | Hubbard | June 14, 1927 |
| 2,022,662 | Geyser | Dec. 3, 1935 |
| 2,029,075 | Knight | Jan. 28, 1936 |
| 2,215,042 | Howard et al. | Sept. 17, 1940 |
| 2,423,488 | Dowe | July 8, 1947 |

FOREIGN PATENTS

| Number | Country | Date |
|---|---|---|
| 71,437 | Switzerland | Jan. 3, 1916 |
| 287,828 | Great Britain | Mar. 29, 1928 |